Oct. 12, 1965  C. J. MOTYCKA  3,211,600

METHOD OF MAKING COMPOSITE CONTOURED CARPETING

Filed July 13, 1961  2 Sheets-Sheet 1

INVENTOR.
Charles J. Motycka.
BY
Harness, Dickey & Pierce.
ATTORNEYS.

Oct. 12, 1965          C. J. MOTYCKA          3,211,600
METHOD OF MAKING COMPOSITE CONTOURED CARPETING
Filed July 13, 1961          2 Sheets-Sheet 2
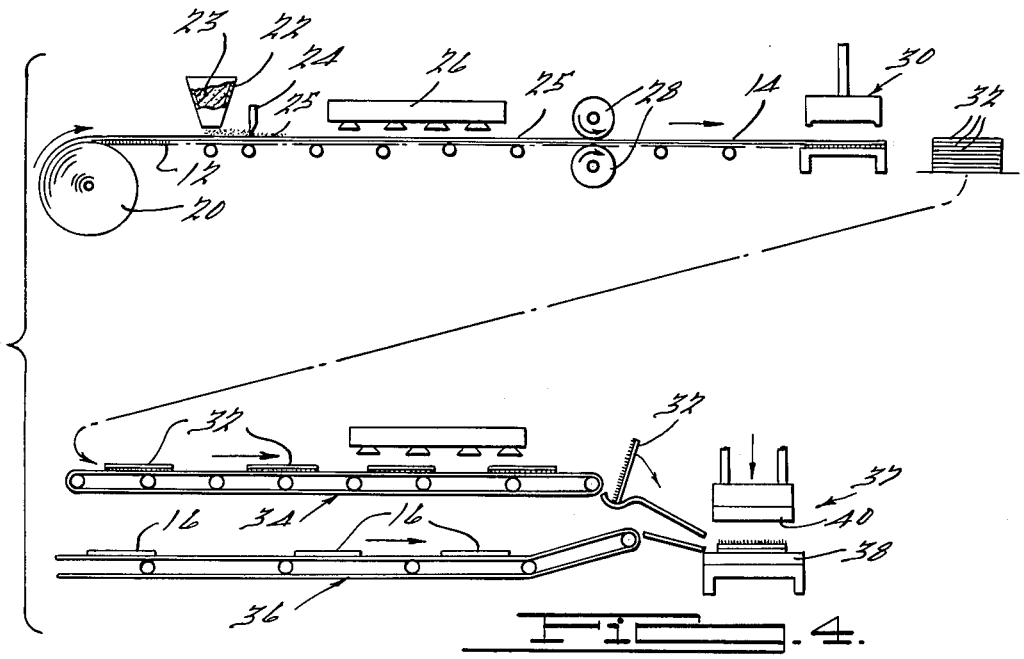
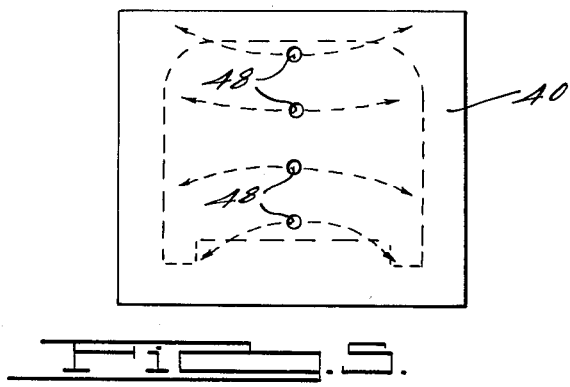
INVENTOR.
Charles J. Motycka
BY
Harness, Dickey & Pierce.
ATTORNEYS United States Patent Office  3,211,600
Patented Oct. 12, 1965

3,211,600
METHOD OF MAKING COMPOSITE
CONTOURED CARPETING
Charles J. Motycka, Detroit, Mich., assignor to Detroit
Gasket & Manufacturing Company, New York, N.Y.,
a corporation of Delaware
Filed July 13, 1961, Ser. No. 123,720
7 Claims. (Cl. 156—214)

The present invention broadly relates to composite contoured carpeting material and more particularly to an improved method and apparatus for fabricating composite contoured carpeting materials incorporating a preselected contour therein.

The method and apparatus for fabricating composite contoured carpeting materials comprising the present invention are particularly applicable for forming contoured floor covering materials for the passenger compartments of modern automobiles. The floor pan of present day automobiles incorporates numerous irregularities therein to provide clearance for chassis components such as the transmission and propeller shaft, for example, and may additionally incorporate recesses and contours therein to promote leg room and seating comfort. As a result, the fitting of floor covering materials in the front and rear passenger compartments of automobiles and the mounting thereof so as to retain a tailored fit throughout its useful life has become increasingly difficult. These problems have been partially overcome by employing floor covering materials having a permanent contour therein corresponding substantially to the contour of the floor pan over which it is mounted.

The methods heretofore used or proposed for use by which a permanent contour has been imparted to carpeting materials, however, are subject to numerous disadvantages. For example, one method heretofore used employs a molten thermoplastic material which is applied in a molten state to the back surface of the carpeting material and on subsequent cooling hardens and maintains the floor covering material in a predetermined shape. A number of significant disadvantages are inherent in this method including the high cost of operation and high investment in equipment for blending the thermoplastic material for melting and mixing the molten composition, and for applying the molten mixture in a controlled amount to the back surface of the carpeting material. In addition to this, the method is subject to an inherent time delay required for melting the plastic and attendant piping during start-up of the equipment and to the tedious and time-consuming practice of cleaning the equipment at the completion of a processing run which detract from the overall operating efficiency and economy of the process.

The use of molten thermoplastic materials has the further disadvantage of restricting the selection of materials that can be employed because of their melting points preventing utilization of those materials having melting points above a temperature at which thermal decomposition or pyrolysis of the thermoplastic material occurs. Another limiting factor is the sensitivity of the floor covering material and dyestuffs contained therein to degradation on coming in contact with the hot molten plastic. Frequently, interruptions in the processing cycle occur during which time the molten thermoplastic material is retained for excessively long periods of time at the elevated temperature resulting in degradation which, on subsequent use, causes variations in the quality of the resultant product and in many cases resulting in scrappage and waste which still further detracts from the economical manufacture of the carpeting material. Of lesser importance but also of significance are the copious quantities of odorous fumes liberated during the melting and application of the molten thermoplastic material to the back of the floor covering material which frequently is objectionable to the operating personnel and in some cases constitutes a health hazard.

It is, accordingly, a primary object of the present invention to provide an improved fabricating method and apparatus for manufacturing contoured composite carpeting materials which overcomes the disadvantages and objections inherent in the methods heretofore known.

Another object of the present invention is to provide an improved manufacturing method and apparatus for making floor covering materials of a composite construction which are formed in a preselected contour and which method and apparatus requires lower capital expenditures for equipment, more efficient and higher productivity, less stringent controls, a reduced tendency toward injuring the floor covering material, and final products having superior characteristics.

Still another object of the present invention is to provide an improved method and apparatus for making composite contoured floor covering materials employing a mold which is operative to increase the rate of cooling of a heat-softened rigidifying agent on the material thereby substantially increasing the production capacity and efficiency of the process.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

FIG. 4 is a schematic view of the process employed for manufacturing the composite floor covering material, and FIG. 5 is a plan view of a typical upper mold half illustrating the positioning of a plurality of air passages therein and the flow of air outwardly toward the periphery of the mold.

Figure 1:
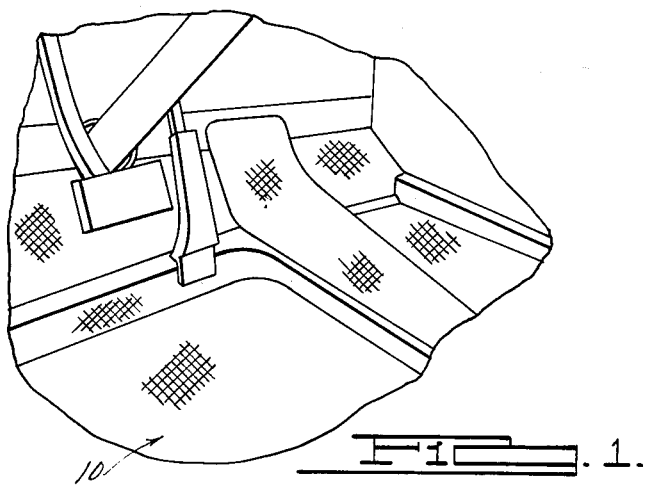
FIGURE 1 is a fragmentary perspective view of the front passenger compartment of a typical automobile.

Referring now to the drawings and as may be best seen in FIGURE 1, the irregularities in the floor pan of a typical front passenger compartment is illustrated over which a composite carpeting material 10 is applied providing for improved sound-deadening of the interior of the automobile as well as enhancing the comfort to the driver and passengers. The composite contoured carpeting 10 extends in a smooth continuous overlying relationship on the floor pan and over the surface contours therein such as the tunnel and upwardly inclined toe board as shown in the drawing. Perforations through the composite contoured carpeting 10 are provided at the places required such as at the rear hinge of the accelerator pedal and at the headlights dimmer switch, for example, to enable the hinge and switch to extend upwardly above the surface of a carpeting from the floor pan on which they are mounted.

Figure 2:
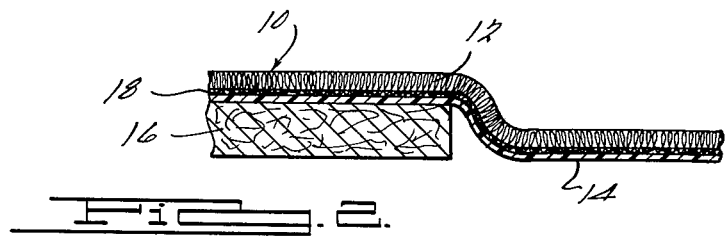
FIG. 2 is a fragmentary transverse sectional view of a composite floor covering material made in accordance with the method and apparatus comprising the present invention.

The composite contoured carpeting 10 as employed in FIGURE 1 and as more clearly shown in FIG. 2, is comprised of a woven or knitted loop or tufted pile carpet material 12 having a substantially continuous coating 14 on the underside thereof and to at least a portion of which a suitable pad 16 is tenaciously bonded. The carpet material 12 can be provided with a suitable backing fabric 18 on the underside thereof over which the coating 14 is applied.

The carpet material 12 can comprise any conventional tufted pile carpeting material or knitted-type carpeting material which have sufficient stretch characteristics to enable them to be stretched and deformed to a preselected contour. The tufted pile-type carpeting material conventionally employs a backing fabric such as burlap or a plain weave sheeting such as muslin through which the tufted piles of the carpeting material are interwoven. Knitted type carpeting materials are conventionally formed wherein the fibers thereof are interlocked and serve as a backing material of themselves. Generally, tufted pile-type backed carpeting materials which are stretchable at least on the bias in amounts of from about 6% to about 50% and a lesser amount such as about 5% along the warp or fill directions are satisfactory. Knitted-type carpeting materials are characterized by their higher stretch characteristics and those allowing for elongations in either the warp or fill direction of up to about 30% and up to about 50% on the bias are satisfactory.

The fibers of both the tufted pile-type fabric backed carpeting material and knitted-type carpeting material are employed in an unsized condition wherein the back thereof is devoid of any size coating to bond the fibers of the tufted piles to the backing fabric or to bond adjacent ones of the fibers of the knitted type carpeting material together. In this unsized condition the carpets are susceptible to unraveling and the coating 14 applied to the back surface thereof as subsequently described, serves among other things, to interlock and adhere the fibers together so as to prevent unraveling thereof.

The pad 16 adhered to the underside of the carpet material 12 as shown in FIG. 2 is conventionally of a thickness ranging from about ¼ inch to about ¾ inch and can comprise any suitable material such as needled jute padding, felt, rubber bonded hair padding, and the like. The pad 16 extends over substantially the entire under surface of the carpet material 12 and is offset from the edges thereof wherein the carpet is affixed to the floor pan or door sills of the passenger car, such as, for example, by an overlying garnish molding.

The coating 14 disposed between the carpet material 12 and underlying pad 16 is of a thermoplastic material which is heat softenable to enable it to be applied to the back surface of a carpet and to enable deformation of the carpet material 12 to the desired contour during the forming operation. The coating 14 serves the multiple purpose of tenaciously bonding the tufted piles to the backing fabric of a woven carpet material or interlocking the fibers of a knitted carpet as hereinabove described and, additionally, serves as an adherent coating for adhering the pad 16 to the underside of the carpet material and as a rigidifying agent for retaining the composite contoured carpeting in a preselected resilient permanent contour.

While a variety of thermoplastic materials have heretofore been employed, including rubber base vulcanizable and non-vulcanizable coatings and other relatively low melting point thermoplastic materials, substantially superior bonding, adhesion, and shape retention are achieved by employing polyethylene type thermoplastic materials which are applied in a powder form in accordance with the method as subsequently described to form a substantially continuous coating on the back surface of the carpet material 12. The physical properties of polyethylene and the flexibility thereof over a broad range of temperatures including temperatures below freezing and up to about 150° F. which are frequently encountered in the interior of a passenger car provide for continued optimum resilient flexibility of the composite contoured carpeting and optimum shape retention.

In order to achieve the benefits of the present invention in accordance with the method disclosed herein, it is necessary that the polyethylene used for forming the plastic coating on the underside of the carpet material be of a specific type, be in a particular form, and possess controlled physical characteristics. Only a selected range of polyethylene type thermoplastic materials have been found suitable for this purpose. Polyethylene resins of the high pressure, low density type, having a density ranging from about .915 up to about .940 which are in a finely particulated form having an average particle size ranging from about 200 mesh up to about 25 mesh and preferably from about 35 to about 75 mesh are suitable. In addition, the polyethylene plastic must be of a relatively high melt index in order to achieve optimum coating and impregnation of the underside of the carpeting material in order that the resultant coating is of the requisite tensile strength, possess satisfactory adhesive characteristics to the carpeting and pad fibers, is of the requisite flexibility over temperatures ranging from about −30° F. up to about 150° F., and provides the necessary resilience and shape retention to the resultant composite contoured carpeting product when subjected to mild distorting forces at ambient temperatures encountered during shipment, installation, and use thereof in the automobile. Polyethylene plastics having a melt index ranging from about 5 up to about 25 and preferably from about 10 to about 15 as determined by American Society of Testing Materials test method designated ASTM D-1238-57 T, condition E. Polyethylene plastics possessing the foregoing critical characteristics are commercially available of which a powdered polyethylene plastic designated as Petrothene M-710 available from U.S. Industrial Chemicals Co., division of National Distillers' and Chemical Corporation, 99 Park Avenue, New York, New York, is particularly satisfactory. This polyethylene plastic is particulated having an average particle size of about 50 mesh, a nominal specific gravity of about 0.917, and a melt index of about 22. Alternate commercially available powdered polyethylene materials can be satisfactorily employed having the chemical and physical characteristics hereinabove enumerated.

The coating 14 is applied to the back of the carpet material 12 in the form of a dry finely particulated powder which is thereafter heated to a softening point and is passed through a rolling operation which serves the dual function of compacting and distributing the softened particulated plastic material into a substantially uniform and continuous film and simultaneously forces the plastic into the interstices of the carpet material assuring penetration and intimate contact between the fibers and backing fabric thereon forming a tenacious interlocking bond therebetween. The coated carpet material is thereafter reheated to soften the coating thereon and is placed over a suitable pad and formed in the desired shape and allowed to cool and harden into a composite floor covering material incorporating the requisite contour.

A typical processing cycle is schematically illustrated in FIG. 4 wherein the carpeting material 12 is continuously unwound from a roll 20 and extended substantially horizontally therefrom beneath a feeder mechanism or hopper 22 containing a finely particulated polyethylene powder 23 which is discharged therefrom in a controlled amount on the back surface of the carpet material. A suitable leveling knife or doctor blade 24 is disposed adjacent to the hopper 22 for distributing the powder 23 in the form of a substantially uniform powder layer 25 over substantially the entire back surface of the carpet material. The quantity of powder required to form a continuous coating varies depending on the particular type of carpet material employed. Generally, quantities ranging from about 6 ounces to about 15 ounces per square yard are satisfactory. Quantities in excess of about 15 ounces per square yard do not provide an appreciable increase in the advantages of the coating and are commerically uneconomical, whereas coatings of less than about 6 ounces per square yard do not provide satisfactory bonding, rigidity, and shape retention of the resultant composite contoured carpet material. The powder 23 is applied in an amount within the aforesaid ranges and preferably in an amount ranging from about 8 to about 10 ounces per square yard of carpet material.

The carpet material 12 having the powder layer 25 thereon thereafter passes beneath a radiant heater assembly 26 which can employ a plurality of Calrod or quartz-type infra red heaters for a period of time sufficient to heat the powder to a point where it will often sufficiently wherein the surfaces of the particles will fuse to a liquid phase and the interior thereof comprise a softened unfused core so as to enable the powder to flow when compressed in the subsequent compacting operation into a clear continuous film and be forced into the interstices of the back of the carpet material. The time of the heating cycle to achieve this condition will vary dependent upon such related factors as the speed of travel of the carpet material 12 beneath the radiant heater assembly 26, the length of the radiant heater assembly, the intensity of the radiant energy transmitted per unit area of the powder layer, and the specific type and quantity of plastic powder employed. Conventionally, the heating cycle is controlled so as to heat the powder layer 25 to a temperature broadly ranging from about 230 to about 300° F., and preferably from about 250° F. to about 265° F. When a Petrothene M-710 50-mesh, low density, high pressure type polyethylene powder is employed in an amount of about 9 ounces per square yard, a heating period of about 50 seconds is required under a radiant heater assembly 26 employing Fostoria type quartz heaters spaced approximately 8 inches above the surface of the powder layer 25. The radiant heating method employed provides the additional advantage in that only the powder layer 25 is raised to an elevated temperature while the underlying carpeting material remains relatively cool avoiding thermal degradation of the carpet fibers and dye stuffs thereon.

Immediately on leaving the exit end of the radiant heater assembly 26, the carpet material 12 having the layer 25 of heat softened plastic powder thereon, is passed between a pair of rolls 28 which are of a heat conductive material such as steel, for example, and are maintained at a relatively cool temperature which effects coalescing of the heat softened particulated powder and formation thereof into a homogeneous coating 14 extending uniformly over the entire back of the carpet material and simultaneously forces a portion of the heat softened powder into the interstices of the tufted fibrous structure forming therewith a tenacious bond for interlocking the fibers of the carpet material and backing fabric, if any, on subsequent cooling of the coating 14. The pressure applied to the carpet material 12 and heat softened powder layer 25 thereon by the rolls 28 preferably ranges from about 160 to about 250 p.s.i.

A surprising feature of the cold compacting rolling operation is that no transfer or offsetting of heat softened powder layer 25 or hot compacted coating 14 occurs from the carpeting to the surfaces of the rolls 28. Furthermore, the rolling operation must be achieved relatively rapidly to attain adequate production rates, such as, for example, a feed rate of from about 20 to about 60 feet per minute whereby the duration of the compacting phase is relatively short and the flow characteristics of the powder must be of the characteristics as hereinbefore set forth to achieve the requisite penetration and coalescing to form a uniform, continuous, homogeneous coating.

After passing between the rolls 28, the carpet material having the partially cooled coating 14 thereon is allowed to air cool to a temperature wherein the coating 14 becomes substantially rigid and non-tacky and can thereafter be rolled for later use. Alternatively, as shown in FIG. 4, the cooled carpeting can be passed into a suitable blanking die or cutter 30 wherein the continuous coated carpeting material is cut into presized carpets 32 of the desired size and configuration. The presized carpet 32 can be stored for an indefinite period of time in this form until the next processing step.

The coated presized carpets 32 are thereafter placed on a suitable conveyor 34 as shown in the lower half of FIG. 4 and are passed beneath a second radiant heater assembly 36 employing infra red heaters therein of the type employed in the heater assembly 26 for a period of time sufficient to heat soften the coating 14 thereon making the coated preshaped carpet 32 pliable and achieving a slight degree of fluidity and tackiness of the upper surface thereof. This condition can generally be achieved by heating the coating to a temperature ranging from about 250° F. to about 325° F., and preferably from about 250° F. to about 285° F. A second conveyor 36 can be employed for supplying a series of preshaped pads 16 to a press 37 which are successively placed over the upper surface of a lower mold 38 thereof over which one of the presized carpets 32 having the heat softened coating 14 thereon is superposed with the coating 14 disposed against the pad 16. Thereafter an upper mold 40 of the press 37 is lowered compressing the coated presized carpet and pad 16 together into a preformed contour and is retained in that position for a cooling period during which the plastic coating 14 rigidifies sufficiently to enable the press 37 to be opened and the composite contoured carpeting 10 removed therefrom. During the molding operation, the heat softened sticky plastic coating 14 in contact with the pad 16 penetrates the surface of the pad and on subsequent cooling provides a tenacious bond between the pad and the overlying carpet material forming a unitary composite carpeting material having a permanent resilient contour therein of the desired configuration.

Figure 3:
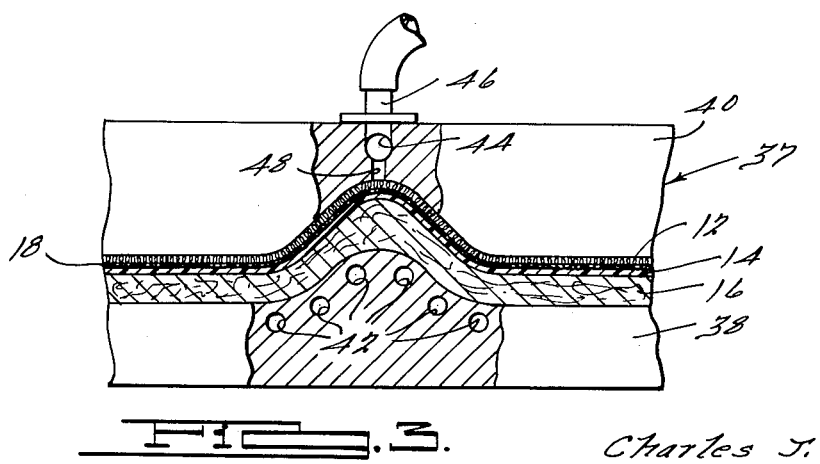
FIG. 3 is a fragmentary transverse vertical sectional view through a mold employed for contouring and forming the composite floor covering material.

To facilitate cooling of the heat softened sticky coating 14 in the press 37, the lower and upper molds 38, 40 are preferably of a heat conductive material such as an aluminum alloy, for example, which are provided with suitable cooling passages therein. A sectional view of a typical press 37 is shown in FIG. 3 wherein the lower mold 38 is provided with a plurality of passages 42 therein which are disposed adjacent to the upper surface thereof through which a suitable coolant such as water, for example, can be circulated to facilitate removal of heat from the composite carpeting material and accelerate the cooling of the hot heat softened coating 14 thereon. While the cooling passages 42 in the lower mold half 38 maintain the mold at a temperature below about 90° F. and are extremely effective to cool those portions of the coating 14 in direct contact therewith, it has been found that the high insulating effect of the pad 16 retards cooling of the coating 14 in those areas where there is an intervening layer of the pad 16.

In accordance with the improved mold assembly design shown in FIG. 3, the upper mold half 40 is provided with a suitable manifold 44 connected to an inlet pipe 46 which is in turn connected to a source of pressurized gas such as air, for example. A plurality of discharge nozzles 48 is best shown in FIGS. 3 and 5, are disposed in communication with the manifold 44 and the lower surface of the upper mold half 40 through which the pressurized gas is discharged. The nozzles 48 are preferably located centrally of the upper mold 40 so that the gas discharged therefrom flows radially outwardly toward the periphery of the mold as indicated by the arrows in FIG. 5 and which gas penetrates the tufted pile of the carpet material penetrating it to a depth adjacent to the hot plastic coating 14 thereon thereby cooling the coating. The gas thereafter sweeps outwardly and escapes through the parting edges of the upper and lower molds. The use of such a cooling gas as air, for example, greatly accelerates the cooling cycle of the molding operation and substantially enhances the production capacity thereof. More rapid cooling can be achieved by incorporating cooling passages 46 and discharge nozzles 48 in both the upper and lower mold halves.

The resultant contoured composite carpeting 10 when removed from the press 37 is characterized as an integrally bonded unit of the carpet material 12 and the pad 16 tenaciously bonded to the underside thereof and which composite carpeting is formed in a permanently contoured configuration and is resiliently maintained in that contour by the cooled plastic coating 14 therebetween.

It will be appreciated from the foregoing operation that the process and apparatus comprising the present invention obviates the heretofore costly and time-consuming operation of employing a separate adhesive coating which is applied either to the pad or underside of the carpeting material to tenaciously adhere the padding and carpeting together. In addition, the use of a powered plastic material applied in accordance with the process hereinbefore described obviates the difficulty and control problems present in methods employing molten plastic material which have the tendency to penetrate and exude through the entire carpeting and visually deface the upper surface thereof detracting from its appearance and usefulness as well as frequently causing damage to the fibers and dye stuff therein due to the high temperatures of the molten plastic coating in contact therewith.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The method of making a composite contoured carpet comprising the steps of applying a substantially uniform layer of a poylethylene powder having an average particle size ranging from about 200 mesh to about 25 mesh in an amount ranging from about 6 ounces to about 15 ounces per square yard on the back surface of a carpet material, said polyethylene having a density ranging from about .915 to about .940 and a melt index ranging from about 5 to about 25, heating said powder to an elevated temperature for a period of time sufficient to effect a softening and partial fusion of the powder particles, compacting said carpet material and the heat softened said powder thereon causing impregnation of the interstices of the back surface of said carpeting material and coalescence of said powder into a substantially uniform coating, reheating said coating to an elevated temperature for a period of time sufficient to effect heat softening thereof and tackiness of the surface thereof, positioning the heat softened said coating in intimate contact with a padding material, forming said carpet and said padding material into a preselected contour, and thereafter cooling said coating providing therewith a composite integrally bonded carpet material having a resilient permanent contour therein.

2. The method of making a composite contoured carpet comprising the steps of applying a substantially uniform layer of a polyethylene powder having an average particle size ranging from about 75 mesh to about 30 mesh in an amount ranging from about 8 ounces to about 10 ounces per square yard on the back surface of a carpet material, said polyethylene having a density ranging from about .915 to about .940 and a melt index ranging from about 10 to about 15, heating said powder to an elevated temperature for a period of time sufficient to effect a softening and partial fusion of the powder particles, compacting said carpet material and the heat softened said powder thereon causing impregnation of the interstices of the back surface of said carpeting material and coalescence of said powder into a substantially uniform coating, reheating said coating to an elevated temperature for a period of time sufficient to effect heat softening thereof and tackiness of the surface thereof, positioning the heat softened said coating in intimate contact with a padding material, forming said carpet and said padding material into a preselected contour, and thereafter cooling said coating providing therewith a composite integrally bonded carpet material having a resilient permanent contour therein.

3. The method of making a composite contoured carpet comprising the steps of applying a substantially uniform layer of a polyethylene powder having an average particle size ranging from about 200 mesh to about 25 mesh in an amount ranging from about 6 ounces to about 15 ounces per square yard on the back surface of a carpet material, said polyethylene having a density ranging from about .915 to about .940 and a melt index ranging from about 5 to about 25, heating said powder to a temperature ranging from about 230° F. to about 300° F. for a period of time sufficient to effect a softening and partial fusion of the powder particles, compacting said carpet material and the heat softened said powder thereon causing impregnation of the interstices of the back surface of said carpeting material and coalescence of said powder into a substantially uniform coating, reheating said coating to a temperature ranging from about 250° F. to about 325° F. for a period of time sufficient to effect heat softening thereof and tackiness of the surface thereof, positioning the heat softened said coating in initimate contact with a padding material, forming said carpet and said padding material into a preselected contour, and thereafter cooling said coating providing therewith a composite integrally bonded carpet material having a resilient permanent contour therein.

4. The method of making a composite contoured carpet comprising the steps of applying a substantially uniform layer of a polyethylene powder having an average particle size ranging from about 75 mesh to about 35 mesh in an amount ranging from about 8 ounces to about 10 ounces per square yard on the back surface of a carpet material, said polyethylene having a density ranging from about .915 to about .940 and a melt index ranging from about 10 to about 15, heating said powder to a temperature ranging from about 250° F. to about 265° F. for a period of time sufficient to effect a softening and partial fusion of the powder particles, compacting said carpet material and the heat softened said powder thereon causing impregnation of the interstices of the back surface of said carpeting material and coalescence of said powder into a substantially uniform coating, reheating said coating to a temperature ranging from about 250° F to about 285° F. for a period of time sufficient to effect heat softening thereof and tackiness of the surface thereof, positioning the heat softened said coating in intimate contact with a padding material, forming said carpet and said padding material into a preselected contour, and thereafter cooling said coating providing therewith a composite integrally bonded carpet material having a resilient permanent contour therein.

5. The method of making a composite contoured carpet comprising the steps of applying a substantially uniform layer of a polyethylene powder having an average particle size ranging from about 200 mesh to about 25 mesh in an amount ranging from about 6 ounces to about 15 ounces per square yard on the back surface of a carpet material, said polyethylene having a density ranging from about .915 to about .940 and a melt index ranging from about 5 to about 25, heating said powder to an elevated temperature for a period of time sufficient to effect a softening and partial fusion of the powder particles, compacting said carpet material and the heat softened said powder thereon by passing said carpet material between a pair of rolls at a pressure ranging from about 160 to about 250 p.s.i. causing impregnation of the interstices of the back surface of said carpeting material and cooling and coalescence of said powder into a substantially uniform coating, reheating said coating to an elevated temperature for a period of time sufficient to effect heat softening thereof and tackiness of the surface thereof, positioning the heat softened said coating in intimate contact with a padding material, forming said carpet and said padding material into a preselected contour, and thereafter cooling said coating providing therewith a composite integrally bonded carpet material having a resilient permanent contour therein.

6. The method of making a composite contoured carpet comprising the steps of applying a substantially uniform layer of polyethylene powder having an average particle size ranging from about 200 mesh to about 25 mesh in an amount ranging from about 6 ounces to about 15 ounces per square yard on the back surface of a carpet material, said polyethylene having a density ranging from about .915 to about .940 and a melt index ranging from about 5 to about 25, heating said powder to an elevated temperature for a period of time sufficient to effect a softening and partial fusion of the powder particles, compacting said carpet material and the heat softened said powder thereon causing impregnation of the interstices of the back surface of said carpeting material and coalescence of said powder into a substantially uniform coating, reheating said coating to an elevated temperature for a period of time sufficient to effect heat softening thereof and tackiness of the surface thereof, placing the heat softened said coating in intimate contact with a padding material disposed between a pair of mated contoured molds, closing said molds and compacting and forming said carpeting and said padding material into a preselected contour, and thereafter cooling said coating by circulating a cooling medium through said mold and discharging a cooling gas through at least one of said molds to penetrate said carpeting material and contact said coating to facilitate dissipation of heat therefrom forming therewith a composite integrally bonded carpeting material having a resilient permanent contour therein.

7. The method of making a composite contoured carpet comprising the steps of applying a substantially uniform layer of a polyethylene powder having an average particle size ranging from about 75 mesh to about 30 mesh in an amount ranging from about 8 ounces to about 10 ounces per square yard on the back surface of a carpet material, said polyethylene having a density ranging from about .915 to about .940 and a melt index ranging from about 10 to about 15, heating said powder to an elevated temperature for a period of time sufficient to effect a softening and partial fusion of the powder particles, compacting said carpet material and the heat softened said powder thereon causing impregnation of the interstices of the back surface of said carpeting material and coalescence of said powder into a substantially uniform coating, reheating said coating to an elevated temperature for a period of time sufficient to effect heat softening thereof and tackiness of the surface thereof, placing the heat softened said coating in intimate contact with a padding material disposed between a pair of mated contoured molds, closing said molds and compacting and forming said carpeting and said padding material into a preselected contour, and thereafter cooling said coating by circulating a cooling medium through said mold and discharging a cooling gas through at least one of said molds to penetrate said carpeting material and contact said coating to facilitate dissipation of heat therefrom forming therewith a composite integrally bonded carpeting material having a resilient permanent contour therein.

References Cited by the Examiner
UNITED STATES PATENTS

| | | | |
|---|---|---|---|
| 2,890,147 | 6/59 | Pearson et al. | 156—34 |
| 2,991,212 | 7/61 | Cotterman et al. | 156—214 |

ALEXANDER WYMAN, *Primary Examiner.*

RUSSELL C. MADER, *Examiner.*